April 8, 1969     N. E. POLSTER     3,438,049

MULTIPLE USE RECORDER

Filed May 24, 1967

United States Patent Office 3,438,049
Patented Apr. 8, 1969

3,438,049
MULTIPLE USE RECORDER
Norman E. Polster, Southampton, Pa., assignor to Leeds & Northrup Company, Philadelphia, Pa., a corporation of Pennsylvania
Filed May 24, 1967, Ser. No. 641,035
Int. Cl. G01d 9/32
U.S. Cl. 346—29                                28 Claims

ABSTRACT OF THE DISCLOSURE

A visual indicator assembly including a planar carriage supporting an indicating and/or recording element which is carried by a supporting member having a V-shaped portion extending along its length, the planar carriage including a pair of spaced apart glide elements biased toward the V-shaped portion such that each glide element of the pair contacts opposite walls of the V thereby establishing four points of gliding contact therewith. Means are also included to provide a third glide element laterally spaced from the pair of glide elements, the third glide element being biased against a plane surface to provide a fifth point of gliding contact so that motion of said planar carriage is limited to back and forth motion lengthwise of said V-shaped portion in accordance with changes in the value of a measured quantity; but the planar carriage is prevented from rotational movement about the axis of the V-shaped portion.

BACKGROUND OF THE INVENTION

Field of the invention

This invention resides in the field of indicating and/or recording a condition and relates to a device capable of providing such indications and/or recordings in several different manners and arrangements.

More specifically, this invention relates to an indicator and/or recorder which includes one or more common components capable of being employed in several different types of indicating and recording systems such that a single device may serve a plurality of useful indicating and recording functions.

Description of the prior art

Several types of indicating and/or recording setups are now known for indicating the value of measured quantities or for recording such quantities on one of several different kinds of charts. Among these type sof indicating and recording setups are tabletop recorders adapted to record information on either rectangular or circular charts. In a rectangular tabletop recorder, for example, one variable may be an independent variable which controls the position of a marker along the X axis and a dependent variable may control the marker position along the Y axis. Alternatively, the variable controlling the marker position along the Y axis may be another independent variable. A pen may be caused to move along the Y axis and either the guide structure supporting the pen may move along the X axis or the chart may be caused to move in the X direction beneath the pen. In the circular chart, or R–θ, configuration the recording pen may be caused to move along a guide disposed parallel to a radius of the chart and either the mechanism guiding the pen may move about a fixed center coincident with the center of a chart, which may be round, or the chart may be caused to rotate under the pen guide. As with the X-Y recorder, the R–θ recorder may be adapted to record with the pen guide moving about a fixed center at a constant angular velocity or the pen guide may move as a function of a measured quantity.

In a strip chart recorder a recording pen traverses the width of a strip chart. The chart may move under the pen at a constant rate or may vary in accordance with the value of a condition.

It is desirable to provide an indicating and/or a recording system including components which may be assembled together in one or more different setups for either indicating and/or recording different types of information. Additionally, it is desirable that the recorder include elements that are common to each of the different setups available so that the total number of components is kept to a minimum in order to achieve simplicity of operation and low cost of production. Different types of recorders, such as the various types described above, should be adapted to be assembled with no loss of accuracy or quality of the chart record resulting from the interchangeability feature of the parts of the recorder. The resulting indicating or recording setup should be accurate, quick acting, and reliable.

It is, therefore, an object of this invention, to produce a multipurpose, low cost, basic indicator assembly which may or may not include a chart marking device.

It is a more particular object of this invention to produce an indicator and recorder including an assemblage of parts adapted to be set up in one of several possible arrangements, each arrangement including at least a basic indicator and/or pen assembly common to all of the arrangements.

It is another object of this invention to produce a highly accurate, low cost and easily assembled tabletop recorder.

It is a further object of this invention to produce a highly accurate, low cost and easily assembled strip chart recorder.

Other objects and advantages of this invention will be apparent to those skilled in the art after reading the following specifications and appended claims.

SUMMARY OF THE INVENTION

Briefly, my invention comprises a planar carriage supporting an indicating and/or recording element which is carried by a supporting member having a V-shaped portion extending along its length, the planar carriage including a pair of spaced apart glide elements biased toward the V-shaped portion such that each glide element of the pair contacts opposite walls of the V thereby establishing four points of gliding contact therewith. Means are also included to provide a third glide element laterally spaced from the pair of glide elements, the third glide element being biased against a plane surface to provide a fifth point of gliding contact so that motion of said planar carriage is limited to back and forth motion lengthwise of said V-shaped portion in accordance with changes in the value of a measured quantity; but the planar carriage is prevented from rotational movement about the axis of the V-shaped portion. The supporting member may be combined with all of the necessary parts for indicating and/or recording various types of information in different ways upon different types of chart paper.

BRIEF DESCRIPTION OF THE DRAWINGS

While the invention is distinctly described and pointed out in the appended claims, a complete description of the invention in some of its various embodiments, together with other objects and advantages of the invention, is contained in the following specification, which should be read in conjunction with the following figures of the drawings in which:

Figures 1, 2, 3, 4, 5, 6, 7, 8:
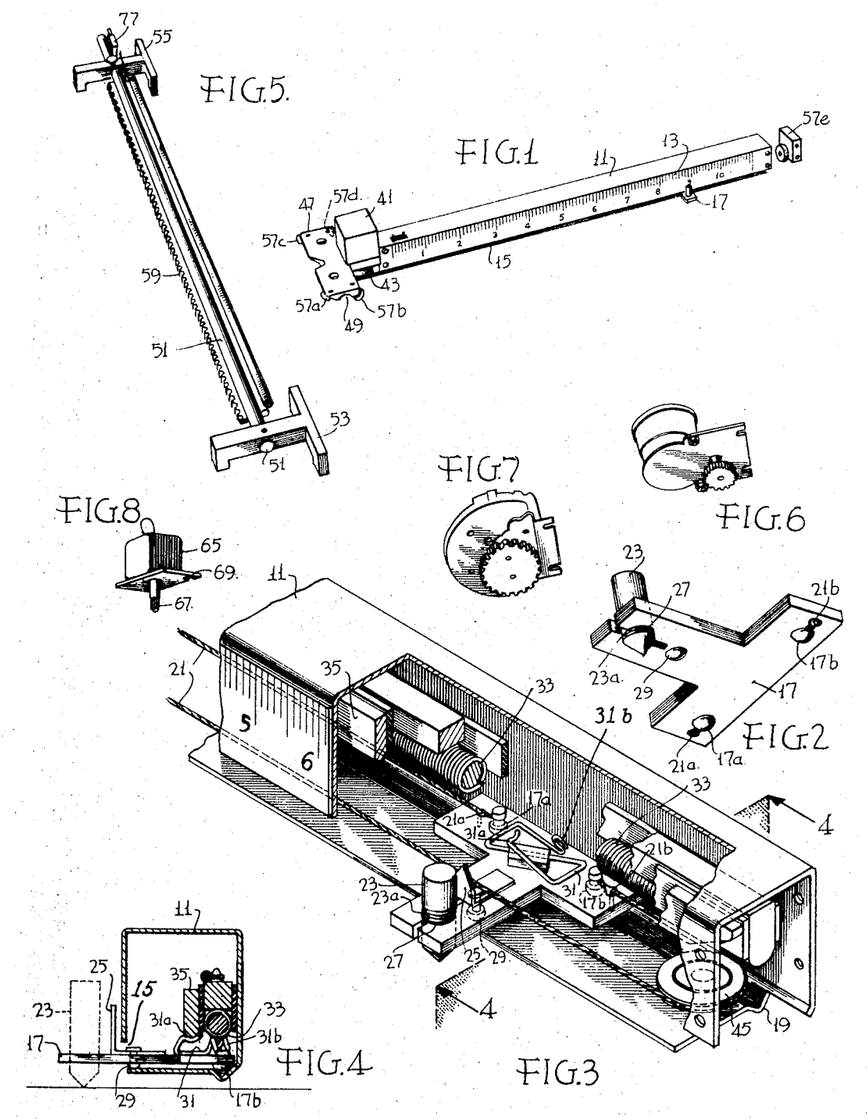
FIG. 1 is a partially exploded perspective view of an elongated carriage support member including a partially visible pen and indicator carriage assembly according to this invention.
FIG. 2 is a perspective view of the underside of a planar carriage including a pen carried thereby.
FIG. 3 is an enlarged perspective view of the assembly shown in FIG. 1 which has been cut away to show the upper surface of the planar carriage shown in FIG. 2.
FIG. 4 is a sectional view of the device of FIG. 3 taken along the lines 4—4.
FIG. 5 is a perspective view of a guide rod, rack gear, and straight slidewire unit adapted to receive the device shown in FIG. 1 for recording in one embodiment.
FIGS. 6, 7, and 8 are perspective views of three alternative motors for use with the indicating and recording elements of this invention.

Referring to FIG. 1, there is shown in perspective an elongated member 11 whose cross-section is substantially rectangular and which may include a scale 13 on the front face thereof. In one corner of the elongated member 11, between the hidden bottom face and the front face, an open slot 15 is provided through which the extreme end of a planar carriage member 17 protrudes. The planar carriage member 17 is shown in perspective in FIG. 2 and an enlarged cutaway perspective view of the elongated member with the planar carriage positioned therein is shown in FIG. 3. In FIG. 2 the planar carriage is illustrated to be in the form of a T and a pair of spherical glide elements 17a and 17b are secured to the undersurface of each end of the cross, i.e., the top portion of the T. In the cutaway view of FIG. 3 and the sectional view of FIG. 4, the planar carriage 17 is shown positioned such that the two glide elements 17a and 17b rest in an elongated V-shaped groove 19 formed in the undersurface of the elongated member 11 and near the rear wall thereof. As will be described in more detail hereinafter, the planar carriage 17 is caused to move along the linear dimension of the elongated member 11 by means of a string or cable 21, the ends of which are knotted and secured in a pair of slotted holes 21a and 21b provided in the planar carriage near the glide elements 17a and 17b, respectively.

The planar carriage member 17 is also provided with either, or both, a marking pen 23 and an indicator 25, as illustrated in FIG. 3, for providing either a permanent record or an instantaneous indication of a measured quantity. The recording pen 23 projects downwardly from the planar carriage member 17 and is adjustably supported in a threaded hole 27 having a slot provided in the end of the planar carriage and is adjustable up or down by the provision of screw threads 23a provided on the body of the pen 23. The pen 23 is biased by a spring 31 lightly but firmly upon a chart (not shown). The threaded adjustment is made so that the pen is perpendicular to the chart.

A third glide point such as 29 coacting with a plane surface and the interaction of the glide elements 17a and 17b in the V-shaped groove 19 with each glide element contacting the V-shaped groove at two points provide a total of five points of constraint to the planar carriage so that its movement is restricted to that in a line parallel with the linear dimension of the groove 19. When the recording pen 23 is utilized the tip of the recording pen provides the third glide point providing the fifth point of constraint for the carriage.

In FIG. 3, the spring member 31 is shown to include two upwardly extending contact ends 31a and 31b secured to the upper surface of the planar carriage 17. The spring 31 provides a bridging electrical contact between a straight slidewire element 33 and a conductive trolley 35 secured to and provided in the elongated member 11. Although the slidewire 33 and trolley 35 are shown cut away in FIG. 9 so that the planar carriage 17 can be seen in greater detail, the bridging contact that the spring 31 makes between these two elements is easily seen in the cross-sectional view, FIG. 4. In FIG. 4 it is readily apparent that the spring end 31a is in contact with the smooth undersurface of the conductive trolley 35 and that a similar contact exists between the spring end 31b and the straight slidewire 33. The contact between the spring 31 and the electrical elements 33 and 35 biases the glides 17a and 17b in the groove 19 and the glide 29 or the tip of pen 23 toward a planar surface.

The completed assembly of the planar carriage and its elongated supporting member comprises a basic indicating or recording means. In FIG. 1 a motor 41 is shown attached at one end of and on top of the elongated carriage support member 11. The output shaft of the motor 41 is in driving connection with a pulley 43 which drives the string 21 attached to the planar carriage 17 and passes about an idler pulley 45. In FIG. 1 the pulley 43 is partially shown directly beneath the motor 41 and in the cutaway view of FIG. 3 the second pulley 45 is shown at the opposite end of the elongated carriage support member 11. The motor 41 may be the motor of an automatic self-balancing measuring system of known type and which positions the planar carriage along the longitudinal dimension of the elongated support member 11 in accordance with the value of a measured quantity. The slidewire and trolley 33 and 35 may be elements of the self-balancing measuring system. For an example of a widely known automatic self-balancing measuring system, see Williams U.S. Patent 2,113,164.

In addition to moving the planar carriage along the longitudinal dimension of the elongated support member 11 in accordance with the value of a measured quantity, means may be provided for moving the entire carriage support member 11 along an axis which may be perpendicular to its longitudinal dimension in accordance with a second measured quantity. To this end an outboard roller member 57e, shown exploded from the far end of the elongated carriage support member 11 in FIG. 1, is provided to permit that end of the member 11 to move freely in the desired direction. The other end of the support member 11 is provided with a bracket means 47, the undersurface of which is provided with a cylindrical groove 49 adapted to clear a linear guide rod 51 shown supported between two supporting feet structures 53 and 55 illustrated in FIG. 5. The undersurface of the bracket member 47 is provided with four rolling members 57a–57d.

The rollers are oriented such that a plane passing through the center of a first pair of rolling members 57a and 57c and perpendicular to their axes contains the axis of the linear guide rod 51 and a plane passing through the center of the second pair of rolling members 57b and 57d and perpendicular to their axes also contains the axis of the linear guide rod 51. This orientation is such that the two planes are at an obtuse angle to each other thereby constraining the bracket member 47 from rotation about any axis perpendicular to the linear guide rod 51 when the four rolling members are in contact therewith. The four contact points at the rolling members 57a–57d plus the fifth contact provided by the outboard roller 57e constrain the support member 11 for movement only in a direction parallel with the axis of the linear guide rod 51.

Although the elongated carriage support member 11 can be moved along the guide rod 51 by hand, in more practical embodiments of this invention some motive means will be provided to facilitate this movement. The bracket member 47 is adapted to hold a motor and the guide rod 51 has attached to it a rack gear 59 with which a pinion gear on the output shaft of such motor may be engaged. FIGS. 6 and 7 illustrate two types of motors which may be secured to the bracket 47 for moving the elongated carriage support member 11 in a direction perpendicular to its longitudinal dimension. That of FIG. 6 is an electric clock motor and that of FIG. 7 is a spring driven motor. FIG. 8 illustrates a motor 65 like motor 41, which may be the balancing motor of an automatic self-balancing measuring system, and having an output gear 67 engageable with the rack 59 and a mounting plate 69 for securing the motor 65 to the bracket member 47. The balancing motor 65 functions to position the elongated carriage support member 11 along the guide rod 51, which is shown perpendicular to the longitudinal dimension of member 11, in accordance with the value of a measured quantity thereby making the entire combination of the structures illustrated in FIGS. 1, 5, and 8 an X–Y recorder of a type which may be set on a chart lying on top of a table.

Figure 9:
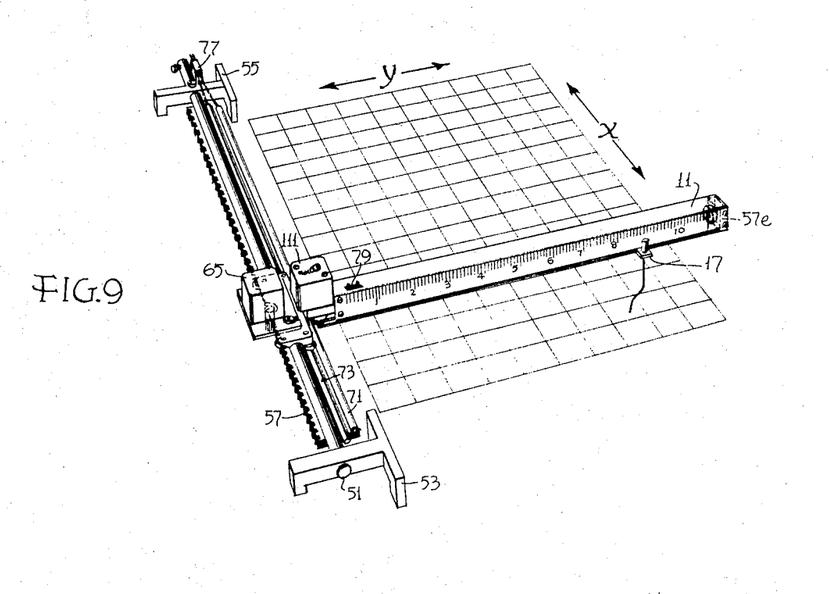
FIG. 9 is a perspective view of an X–Y recorder in one embodiment according to this invention.
Figures 10, 11:
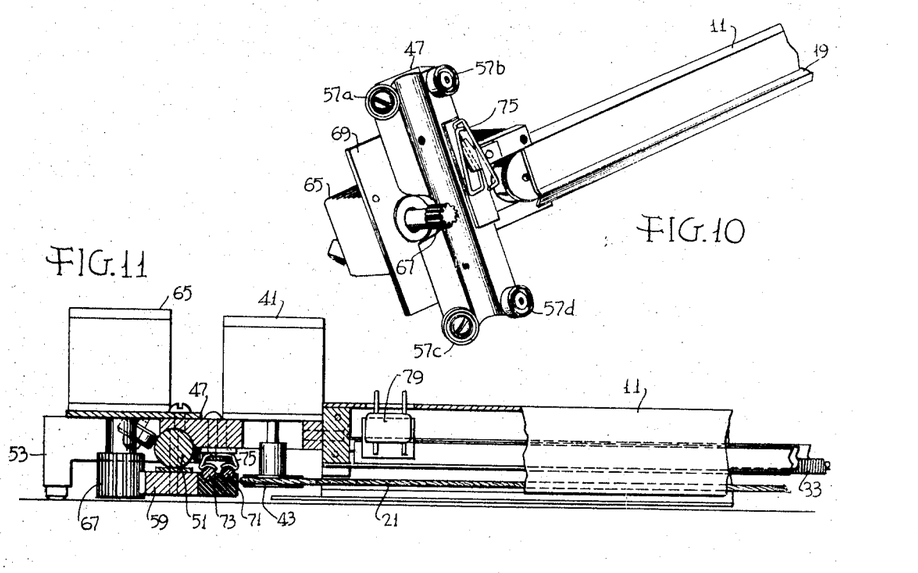
FIG. 10 is a perspective view of a portion of the underside of the elongated carriage support member assembly of FIG. 9.
FIG. 11 is a side elevation, partially in section, of the assembly of FIG. 9.

Such a recorder is illustrated in perspective in FIG. 9 and the undersurface of the elongated carriage support member 11 and its bracket member 47 are illustrated in perspective in FIG. 10. In FIG. 11 there may be seen the linear guide rod 51, the mounting for which carries a pair of straight electrical conductive members including a straight slidewire element 71 and a conductive trolley 73. The undersurface of the bracket member 47 is provided with a spring contact member 75 which provides a bridging contact between the slidewire 71 and the trolley 73. The undersurface of the bracket member 47 is procombination 71 and 73, are all connected in a self-balancing system of conventional type (not shown) to position the elongated carriage 11 along the guide rod 51 in accordance with the value of a measured quantity. Instead of using the slidewire and trolley combination in a self-balancing system to position the elongated carriage along the guide rod 51, the pinion 67 may be driven by some other means and the slidewire 71 employed as a retransmitting slidewire to provide an electrical signal representative of the position of the elongated carriage along the guide rod 51. Electrical connections to the two balancing motors 41 and 65 can be brought into the tops thereof. The slidewire and trolley elements 71 and 73 are connected to a measuring circuit through a terminal device 77. The slidewire and trolley positioned within the elongated carriage support member 11 can be connected to a measuring circuit through a terminal device 79 which protrudes through the top of the support member 11 (FIG. 9).

Figures 12, 15:
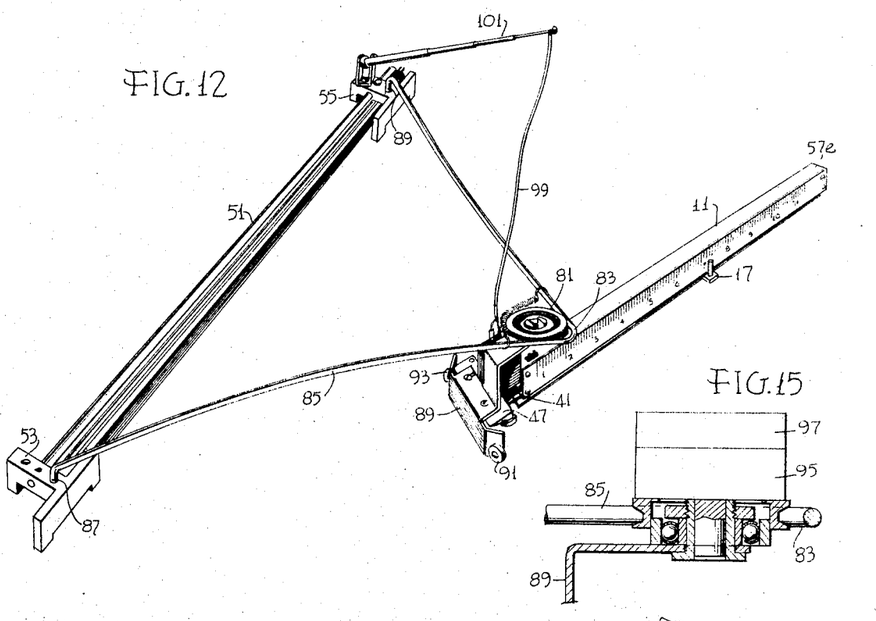
FIG. 12 is a perspective view of an R–θ recorder according to another embodiment of this invention.
FIG. 15 is a side elevation view of the structure of FIG. 14 with the additional showing of a motor and a slidewire mounted thereon.
Figure 13:
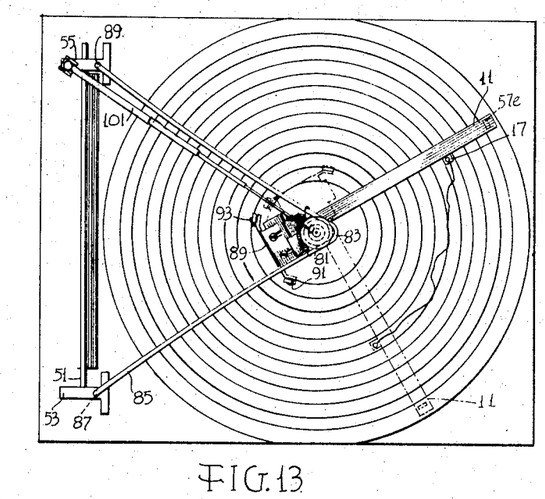
FIG. 13 is a top plan view of the arrangement of FIG. 12.
Figure 14:
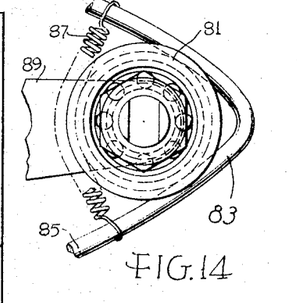
FIG. 14 is a top plan view on an enlarged scale of a portion of the arrangement shown in FIGS. 12 and 13.

Many of the elements illustrated in the combination forming the X–Y recorder illustrated in FIG. 9 can also be arranged in an embodiment known as an R–θ or polar recorder which provides an indication and/or a record of angular and radial position of a pen on a circular chart. An embodiment of this type is illustrated in FIG. 12 in perspective and a plan view of the embodiment of FIG. 12 recording on a circular chart is illustrated in FIG. 13. In FIG. 12 the elongated carriage support member 11 is supported in a pivotal manner from a hub 81 which is secured in a bend 83 of a bent rod 85, the turned-down ends 87 an 89 of which are pushed into holes provided in the end feet members 53 and 55 which support the linear guide rod 51. A detailed view of the hub member 81 is illustrated in FIG. 14, and shows it to be secured in the bend 83 by means of a spring 87 which spans the bent rod 85 and forces the hub 81 into the bent portion 83. The elongated carriage support member 11 is secured to a bearing member of the hub 81 by means of a bracket 89 to which is secured the bracket 47. The bracket 89 includes a pair of rollers 91 and 93 which with roller 57e allows the member 11 to rotate about the axis of the hub member 81. The axis of the hub 81 is positioned so that its axis is perpendicular to the chart, intersects the chart at its center, and coincides with the axis of the pen when the pen is at the "zero" position. In order to permit rotation of the member 81 for at least 360°, the bent rod 85 is made long enough so that the member 11 is spaced from the guide rode 51 a sufficient distance.

In FIG. 13 a circular chart is shown being recorded upon by the structure described in FIGS. 12 and 14 and a curve is shown drawn on the chart from the phantom line position of the elongated carriage support member 11 to its solid line position. It will be apparent that the radial position of points along the curve is dictated by the positioning of the planar carriage member 17 along the longitudinal dimension of the elongated carriage support member 11 while the angular position of points along the curve is dictated by the angular position of the elongated carriage support member 11. The radial position of the planar carriage member 17 is determined by the response of the reversible balancing motor 41 while the angular position of the elongated carriage support member 11 is determined manually or by any type of motor such as a constant speed motor, a variable speed motor, or a second balancing motor which may be mounted at hub 81. A hub motor 95 may be positioned atop the hub 81 as illustrated in FIG. 15 and its output shaft can be secured to a rotating member supported by the hub and fastened to the elongated carriage support member 11. If the motor 95 is the balancing motor of an automatic self-balancing system, a slidewire and trolley combination 97 must be provided. These are illustrated diagrammatically in FIG. 15 sitting atop the motor 95. The electrical connections between the motors and the slidewiretrolley combinations can be made to the remotely located measuring circuits through a flexible electrical connection 99 and a whip type antenna 101 secured to one of the end feet members 53 and 55 to allow angular movement greater than 360°. In the embodiment of FIGS. 12 to 15 it will be apparent that one measured quantity may determine the radial position of the planar carriage 17 on the chart while a second measured quantity can determine the angular position of the planar carriage on the chart. It will be further apparent that the same elements described with respect to the embodiments of FIGS. 1 through 11 are utilized in the embodiment described with respect to FIGS. 12 through 15. The interchangeability of the various elements and the ease with which they can be assembled and disassembled into various recording and indicating embodiments is one of the primary characteristics of this invention.

Figure 17:
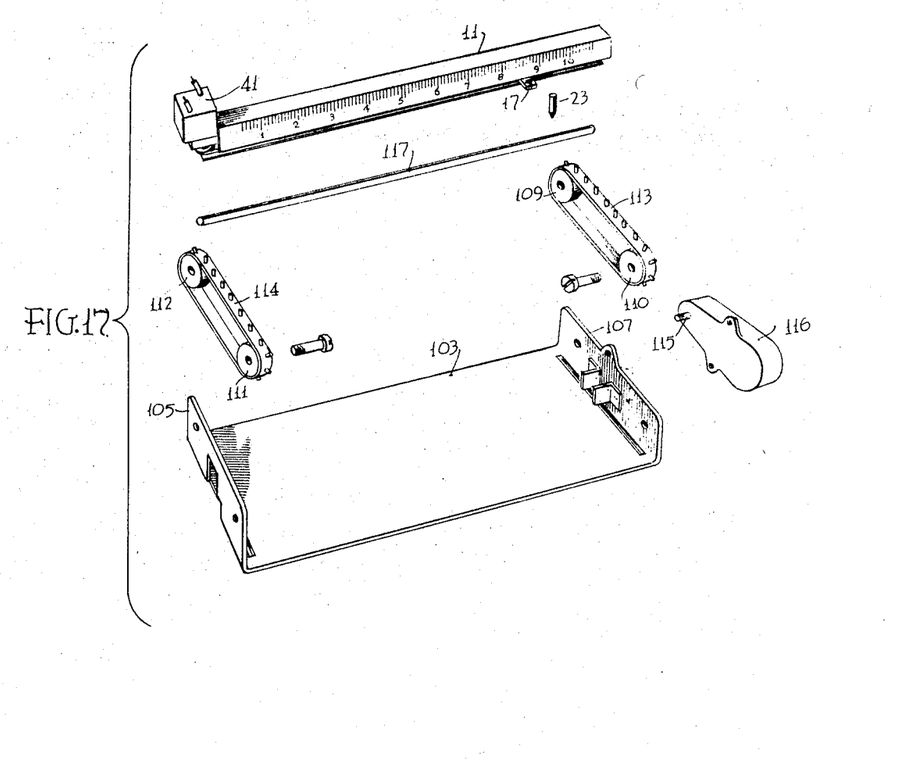
FIG. 17 is an exploded view of the recorder depicted in FIG. 16.

A further modification of this invention is illustrated in FIG. 6 in which the elongated carriage support member 11 is used in a strip chart configuration. In this embodiment the member 11 is positioned across the width of a movable strip chart, the latter of which is driven under the member 11 at a desired speed by a motive means 116. The motor 41, mounted on one end of the elongated carriage support member 11, positions the planar carriage 17 across the width of the strip chart in accordance with the value of a measured condition thereby providing a record on the chart as a function of time. The mechanism for moving the chart under the elongated carriage support member 11 is more readily seen in the exploded view of FIG. 17. In FIG. 17 a chart bed 103 includes a pair of upturned flanges 105 and 107 across which spans the elongated carriage support member 11. Chart drive wheels are rotatably mounted on either side of the elongated carriage support member 11 on the upturned flanges 105 and 107. Around each pair of wheels 109–112 is one of a pair of sprocket belts 113 and 114 which engage a series of holes provided in each edge of the strip chart in a manner well known to those skilled in the art. The wheel 109 is driven by the output shaft 115 of motor 116 which is mounted on the outside of the upturned flange 107. This wheel in turn drives an opposite wheel 112 by means of a cross shaft 117.

Figure 16:
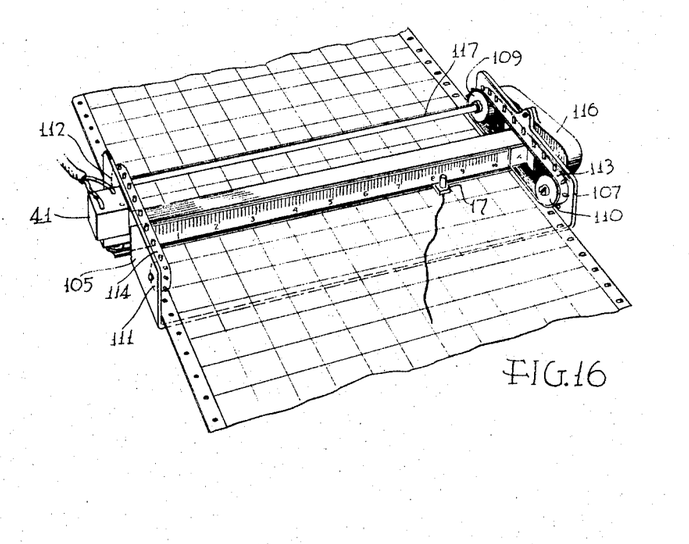
FIG. 16 is a perspective view of a recorder in accordance with still another embodiment of the present invention.

Thus, the same elongated carriage support member 11 utilized in the previously described embodiments is readily adapted to be incorporated in a strip chart recorder of the type illustrated in FIG. 16.

Figures 18, 19, 20:
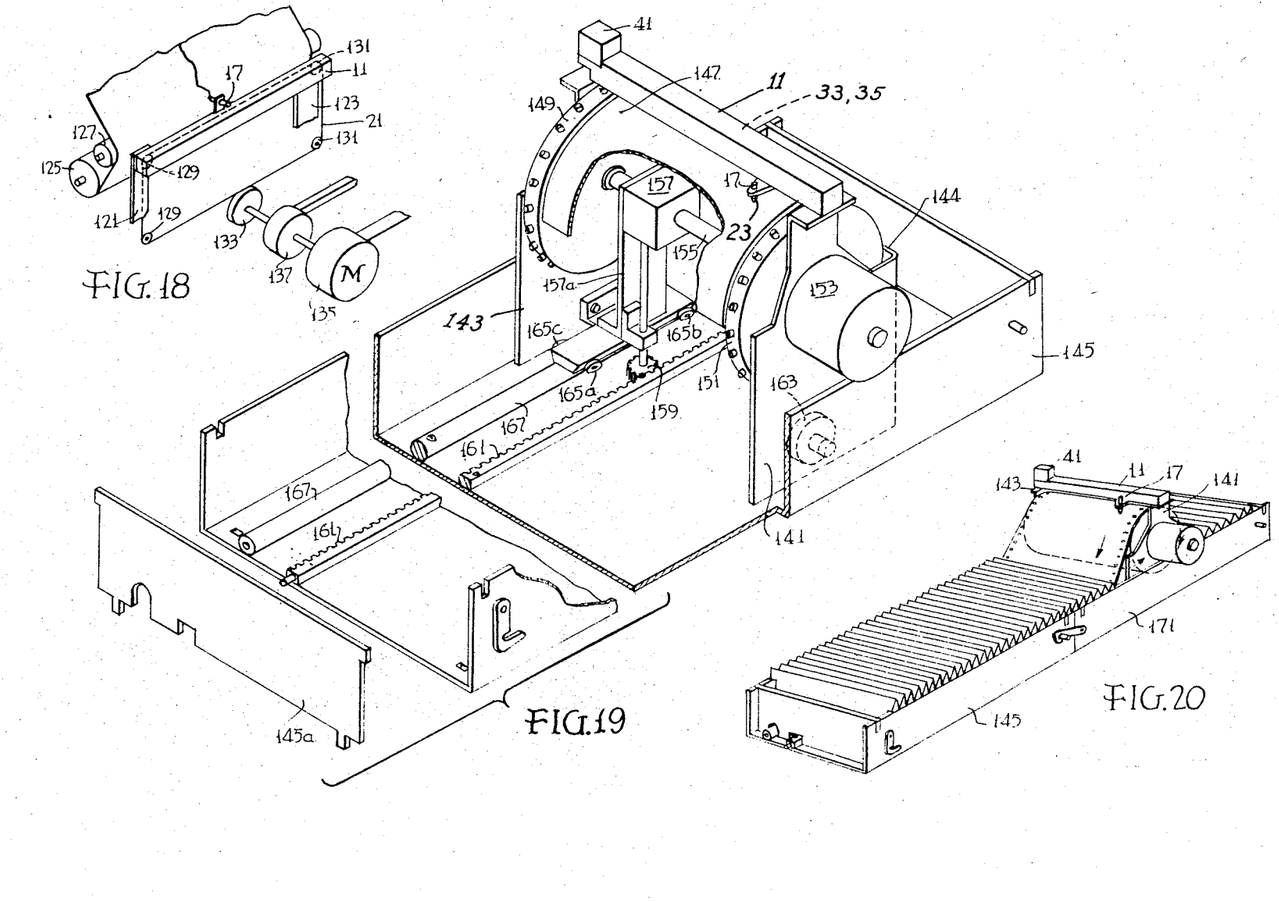
FIG. 18 shows a perspective view of still another recorder arrangement using this invention.
FIG. 19 shows a cutaway perspective view of a portion of yet another type of recorder employing this invention.
FIG. 20 shows a perspective view of the embodiment of this invention illustrated in FIG. 19.

Referring to FIG. 18, a further embodiment is illustrated in which the elongated carriage support member 11 is utilized to record on a moving strip chart supplied from a supply roll. FIG. 18 diagrammatically illustrates the elongated carriage support member 11 being supported from a pair of bracket members 121 and 123 (shown broken off in FIG. 18) and recording on a moving chart which unwinds from a supply roll 125 due to the action of a drive roll in a manner well known by those skilled in the art. In this embodiment, instead of providing a motor directly on the elongated carriage support member 11, as in some of the previously described embodiments, the planar carriage 17 is connected by means of the cable 21 and pairs of pulleys 129 and 131 to a drum 133 on the output shaft of a motor 135. FIG. 18 also illustrates an embodiment whereby the internal straight slidewire and trolley combination 33 and 35 of the member 11 can be replaced by an external circular slidewire 137 mounted on the output shaft 133 of the motor 135. Thus, in the embodiment of FIG. 18 only the mechanical parts of the elongated carriage support member 11 are utilized and no electrical connections thereto are necessary.

Still another embodiment of this invention is illustrated in FIGS. 19 and 20. In this embodiment the elongated carriage support member 11 together with its planar carriage 17, recording pen 23, slidewire 33, trolley 35, and the driving motor 41 are mounted atop a pair of vertically extending side walls 141 and 143 of a frame structure 144 which is adapted to travel the length of rectangular box 145. As illustrated in FIG. 20 the box 145 contains fan-folded chart paper which includes tab structure at the fold lines to suspend elements of the folded chart from the edges of the box in a series of connected vertical sheets. Charts of this type and methods of handling them are disclosed in U.S. Patent 3,229,301, Polster et al. The chart paper is threaded between the elongated carriage support member 11 and the top of a cylindrical surface 147 which is also a part of the frame 144 having the side walls 141 and 143. A pair of sprocket wheels 149 and 151 are provided at either end of the cylindrical surface 147 and are driven in a rotary fashion by means of a timing motor 153 secured to the side wall 141. The sprockets engage holes provided in each edge of the fan-folded chart paper, in the area directly under the elongated carriage support member 11, continuously to move the chart paper in recording position past the pen. The chart is drawn from one end of the box 145 and deposited in the other end.

The cylindrical surface 147 is shown cut away in FIG. 10 to expose a driving connection between an output shaft 155 of the motor 153 and a speed reduction gear box 157 connected to a driven gear 159. A rack gear 161 is secured along the longitudinal dimension of the box 145 on or near the floor thereof and is in engagement with the driven gear 159. When the motor 153 drives its output shaft 155, the entire frame structure 144 moves along the longitudinal dimension of the box 145 due to the driving action of driven gear 159 along rack gear 161. Straight line movement is made possible by the provision of rollers 165a–165d mounted on a support 157a carried on side wall 143 of the frame 144 and guided along a straight line by means of the rollers 165a–165d riding along a linear guide rod 167 which is secured to the bottom of the box 145. A roller 163 mounted on side wall 141 supports the opposite end of the frame 144. The gearing arrangement within the gear box 157 is such that the direction of movement of the frame 144 is opposite to the direction of chart movement. In operation the entire recording structure walks from one end of the box 145 to the other at a very slow speed while chart paper is drawn from one end of the box and is deposited in the other end at a relatively rapid rate of speed. By this arrangement a very long length of chart paper, perhaps a mile or so, can be contained and recorded upon within the confines of a relatively small box.

Before the entire length of chart paper within a single box is exhausted, a continuation of the record can be made by adding a box 171 at the end of box 145 and joining the chart sections so that the recorder may move into the new box as shown in FIG. 20. After recording has been established in the new box 171, the paper may be severed from box 145 and box 145 removed for storage. It is apparent that due to the fan-folded nature of the chart paper, ready access at any position along the chart is had without having to unroll a long length of chart from a roller. It is also apparent that the fan-folded strip chart embodiment of FIGS. 19 and 20 utilizes the same elongated carriage support member 11 as in the previously described embodiments and that this member is readily lifted off of any of the previously described embodiments and rearranged or reassembled in other of these embodiments.

Furthermore, it is to be understood that in this application the use of the word "motor" is intended to include any suitable motor, mechanical or electric, variable or constant speed, a balancing motor of a balancing network, etc.

What is claimed is:

1. A visual indicator assembly comprising in combination:
   a planar carriage for supporting an indicating means,
   an elongated carriage support member having bottom, side and top walls formed from a single piece and having a V-shaped portion extending along the longitudinal dimension of the bottom wall thereof,
   two spaced-apart glide elements secured to protrude from one side of said planar carriage and having relatively smooth surfaces, each glide element engaging opposite walls of said V-shaped portion,
   means operative against opposite faces of the plane of said planar carriage to constrain said planar carriage in an operating plane, said constraining means causing said glide elements to remain in sliding engagement with the walls of said V-shaped portion and preventing free rotational movement of said planar carriage about the longitudinal axis of said elongated carriage support member, and
   said planar carriage adapted to be positioned along the longitudinal dimension of said elongated carriage support member in accordance with the value of a condition to be indicated.

2. A visual indicator assembly in accordance with claim 1 wherein said constraining means comprises:
   a spring disposed to exert a bias on one face of the plane of said planar carriage, and
   a third glide element coacting with the opposite face of the plane of said planar carriage and a plane surface adjacent thereto to restrain movement of said carriage in a direction as would otherwise occur due to the bias exerted on said planar carriage by said spring.

3. A visual indicator assembly in accordance with claim 1 including in combination means supporting a motor mechanically connected to said planar carriage to position said carriage along said elongated carriage support member.

4. A visual indicator assembly in accordance with claim 3 wherein said motor is mounted on said elongated carriage support member.

5. A visual indicator assembly in accordance with claim 1 and further including in combination:
   a slidewire disposed along the longitudinal dimension of said elongated support member and substantially throughout the length thereof, and
   wherein said constraining means includes a spring carried by said planar carriage and disposed between said slide-wire and said planar carriage,
   said spring including an electrical contact structure adapted to contact said slidewire.

6. A visual indicator assembly in accordance with claim 5 wherein,
   a motor is mechanically linked to said planar carriage for positioning said carriage along the longitudinal dimension of said elongated carriage support member thereby to position said contact along said slidewire.

7. A visual indicator assembly in accordance with claim 6 wherein said slidewire and contact are included in a measuring network for controlling operation of said motor to render the position of said contact along said slidewire a function of a measured quantity.

8. A visual indicator assembly in accordance with claim 6, wherein,
   said motor is mounted on said elongated support member,
   and further including in combination a return trolley disposed along the longitudinal dimension of said elongated support member and parallel with said slidewire, and
   wherein said electrical contact structure bridges said slidewire and said trolley.

9. A visual indicator assembly in accordance with claim 4 wherein said third glide element comprises:
   a marking means carried by said planar carriage and protruding beyond the confines of said elongated carriage support member, and said plane surface adjacent said planar carriage is a record receiving means, the contact between the record receiving means and said marking means providing a constraint to said planar carriage to prevent movement in a direction as would otherwise occur due to the bias exerted by said spring, and further including in combination
   structure for supporting said elongated carriage support member in recording relation with a record receiving means.

10. A visual indicator assembly in accordance with claim 9 wherein said structure for supporting said elongated carriage support member in recording relation with a record receiving means is a portion of the frame of a recorder, and including in combination, a motor having a drive connection to said planar carriage to position said carriage along said elongated support member.

11. A visual indicator assembly in accordance with claim 10 wherein said motor is mounted on said elongated carriage support member.

12. A visual indicator assembly in accordance with claim 9 wherein said structure for supporting said elongated carriage support member in recording relation with a record receiving means includes means rendering said elongated carriage support member and a record receiving means relatively movable.

13. A visual indicator assembly in accordance with claim 12 wherein said means rendering said elongated carriage support member and a record receiving means relatively movable comprises a chart drive for moving a record receiving means past said elongated carriage support member.

14. A visual indicator assembly in accordance with claim 13 wherein said record receiving means is a strip chart and additionally including means providing for controlled movement of said elongated carriage support member along the length of said strip chart while said strip chart is being driven past said elongated carriage support member by said chart drive means.

15. A visual indicator assembly in accordance with claim 12 wherein said means for rendering said elongated carriage support member and a record receiving means relatively movable comprises a plurality of rollers affixed to said elongated carriage support member, and guide structure establishing a path of motion for said member whereby said elongated carriage support member may move with respect to said record receiving means.

16. A visual indicator assembly in accordance with claim 15 including a motor having a mechanical drive connection with said elongated carriage support member for moving said support member through said path established by said guide structure.

17. A visual indicator assembly in accordance with claim 15 wherein said guide structure comprises a linear guide means for guiding some of said rollers and having means to receive a driven member driven by said motor which is mounted on and bodily movable with said elongated carriage support member to propel said elongated carriage support member over the path established by said linear guide means.

18. A visual indicator assembly in accordance with claim 15 wherein said guide structure comprises a hub structure disposed with its axis normal to a plane including said path of motion and intersecting a line of motion of said marking means established by movement of said planar carriage along the longitudinal dimension of said elongated carriage support member and wherein said hub structure retains one end of said carriage support member for circular movement of said member about the axis of said hub structure along said path, and a motor mounted adjacent said hub structure and having a drive connection with said elongated carriage support member to effect movement of said member over said path.

19. A visual indicator assembly in accordance with claim 18 in which said hub structure is supported by bracket structure which is in turn supported by a linear guide structure, and wherein said bracket structure extends a distance from said linear guide sufficient to permit complete circular movement of said carriage support member.

20. A visual indicator assembly in accordance with claim 17 wherein a straight slidewire is disposed parallel to and substantially coextensive with the length of said track, and a slidewire contact is carried by said elongated carriage support member to render the position of said slidewire contact with respect to said slidewire representative of the position of said support member along said track.

21. A visual indicator assembly in accordance with claim 18 wherein a circularly disposed slidewire is supported adjacent said hub structure, a slidewire contact supported for engagement with said slidewire, and means producing relative movement between said slidewire and said slidewire contact upon movement of said elongated carriage support member about said axis to render the position of said slidewire contact with respect to said slidewire representative of the position of said support member along said path.

22. A visual indicator assembly comprising:
   an elongated carriage support member including a carriage guide and carriage retention means,
   a carriage for supporting an indicating means and a marking means slidable along said guide and retained in constant engagement therewith by said retention means,
   a balancing motor, a slidewire and a slidewire contact of an automatic self-balancing system carried by said elongated carriage support member, a drive connection between said balancing motor and said slidewire and said slidewire contact to adjust the relative position of said contact along said slidewire for control of said balancing motor, a driving connection from said balancing motor to said carriage for positioning said carriage along said carriage guide in accordance with the position of said slidewire contact along said slidewire and therefore the value of a measured quantity, and support structure for said elongated carriage support member including means permitting direct lift-off engagement of said elongated carriage support member from an element of said support structure for complete separation therefrom thereby permitting transfer of said elongated carriage support member from said element to an element of another support structure.

23. A visual indicator assembly in accordance with claim 22 and further including motive means for said elongated carriage support member, said motive means being mounted on said elongated carriage support member and having drive means engageable with an element of said support structures including means permitting direct lift-off engagement of said elongated carriage support member, and said support structures for said elongated carriage support member including means to guide movement of said elongated carriage support member when moved by said motive means therefor.

24. A visual indicator assembly in accordance with claim 23 wherein said supporting structures include a rack gear and said drive means of said motive means includes a pinion gear adapted for lift-off driving engagement with said rack gear.

25. A visual indicator assembly in accordance with claim 24 wherein said supporting structure includes an elongated slidewire and trolley combination disposed in fixed parallel relationship with said rack gear and wherein said elongated carriage support member includes an electrical contact extending therefrom in sliding engagement with said slidewire and trolley combination.

26. A visual indicator assembly in accordance with claim 25 wherein said motive means, said slidewire and trolley combination, and said electrical contact are included in an automatic self-balancing measuring system whereby said motive means positions said elongated carriage support member at positions along said rack gear in accordance with the value of a measured quantity.

27. A visual indicator assembly in accordance with claim 22 and further including in combination:

motive means mounted on a part of said support structures for driving a strip chart in recording relation to said elongated carriage support member.

28. A visual indicator assembly in accordance with claim 22 and further including in combination:

a box-like container for a fan-folded strip chart having fold lines defining a plurality of sheets, motive means carried by one of said support structures for said elongated carriage support member and movable therewith for moving sheets of said strip chart from one end of said container into record receiving relation past said elongated carriage support member and returning said sheets to the other end of said container, and said motive means simultaneously moving said elongated carriage support member with respect to said container in a direction opposite to the direction of movement of said sheets with respect to said elongated carriage support member.

References Cited

UNITED STATES PATENTS

| 1,891,502 | 12/1932 | Sayre | 346—8 |
| 2,113,748 | 4/1938 | Ross et al. | 346—44 |
| 2,287,819 | 6/1942 | Nichols | 346—128 |
| 2,446,400 | 8/1948 | Woolley | 346—117 X |
| 2,467,808 | 4/1949 | Canada | 346—34 |
| 2,647,813 | 8/1953 | Watson | 346—139 |
| 3,019,072 | 1/1962 | Bose et al. | 346—29 |
| 3,084,014 | 4/1963 | Molloy | 346—139 |
| 3,268,909 | 8/1963 | Green | 346—111 |

RICHARD B. WILKINSON, *Primary Examiner.*

JOSEPH W. HARTARY, *Assistant Examiner.*

U.S. Cl. X.R.

346—32, 136, 139, 145